(12) United States Patent
Gadish

(10) Patent No.: US 6,202,087 B1
(45) Date of Patent: Mar. 13, 2001

(54) REPLACEMENT OF ERROR MESSAGES WITH NON-ERROR MESSAGES

(75) Inventor: Ofer Gadish, Nitzana 5, Hadera 38248 (IL)

(73) Assignees: Ofer Gadish, Hadera (IL); Ron Gutman, Eichron Yaakov (IL)

( * ) Notice: Subject to any disclaimer, the term of this patent is extended or adjusted under 35 U.S.C. 154(b) by 0 days.

(21) Appl. No.: 09/273,458

(22) Filed: Mar. 22, 1999

(51) Int. Cl.$^7$ ..................................................... G06F 13/00
(52) U.S. Cl. .............................................................. 709/206
(58) Field of Search .................................... 709/246, 206; 714/49; 370/216

(56) References Cited

U.S. PATENT DOCUMENTS

| | | | |
|---|---|---|---|
| 5,920,661 | * | 7/1999 | Mori et al. ............................ 382/317 |
| 5,923,552 | * | 7/1999 | Brown et al. ........................ 700/100 |

* cited by examiner

Primary Examiner—Kenneth R. Coulter

(74) Attorney, Agent, or Firm—Mark M. Friedman

(57) ABSTRACT

A system and a method for replacing error messages with non-error messages. The system includes a network device for sending a query, a server device for receiving the query and a non-error message generator for generating and sending a non-error message to the network device. Alternately, the system may include a network device for sending the query and a server device, for receiving the query and for determining whether the query is resolvable. If the query is non-resolvable, the server device forms the non-error message and sends it to the network device. The method may include the steps of providing a network device, providing a server, sending the query to the server, receiving the query and generating the error message if the query is not resolvable by the server, intercepting the error message and altering the error message to form the non-error message sending the non-error message to said network device. Alternately, the method may include the steps of providing a network device, providing a server, sending a query from the network device to the server, receiving the query at the server and generating the error message if the query is not resolvable by the server, and intercepting the error message received at the network device to send a non-error message in place of the error message.

28 Claims, 3 Drawing Sheets

DNS Packet:

DNS Header:

REPLACEMENT OF ERROR MESSAGES WITH NON-ERROR MESSAGES

FIELD AND BACKGROUND OF THE INVENTION

The present invention relates to a system and a method for replacement of error messages with non-error messages, and in particular, for the replacement of such an error message received as the result of a failed address resolution request through the Internet.

The explosion of connections by individual users to the Internet, and the vast increase in the number of Web sites, has made the search for information difficult. A resource on the Internet, such as a Web site, is accessed by indicating its unique address, such as an IP (Internet Protocol) address. Often a resource is requested by resource name, as a text string for example, rather than by resource address. A suitable address resolution mechanism is therefore required to translate the resource name into the corresponding address. Since the character of the Internet is inherently dynamic, with many different resources, resources may be requested which no longer exist, have a changed name, or indeed never existed at all. Therefore, many requests for address resolution fail, in which case the resolving mechanism returns an error message. By displaying this error message, software programs indicate to the user that the requested resource name was not found in the address database or the server could not process the request, but does not give much more information to the user.

Rather than simply displaying an error message, a more useful solution would redirect the user to another resource, in which the user can optionally find additional information. For example, if the requested resource is a Web site or a Web page, the other resource could optionally be a Web page which not only indicates that the request has failed, but also suggests additional information such as links to alternative Web pages, a search engine, or advertisements. This information could be specific to the requested resource name, the type of the software program that generated the request, and/or the identity or other properties of the requesting user. Thus, much more focused, specific information could be delivered to the user, rather than simply indicating that the requested address resolution had failed.

Although certain Web browser software products attempt to provide such additional information by intercepting the error message at the client computer, these products do not change the packet of the error message in order to provide such additional information. Rather, these products simply display a different message through the Web browser. Thus, currently no software program is available which changes the packet of the error message in order to provide the additional information to the user.

Therefore, there is an unmet need for, and it would be highly useful to have, a system and a method for replacing error messages, with non-error messages produced by changing the packet of the error message itself. The non-error messages optionally direct the requester to information specific to the requested resource name, the type of the software program that generated the request, and/or the identity or other properties of the requesting user.

SUMMARY OF THE INVENTION

The present invention is of a system and a method for replacing error messages, received from a server as a result of requests which are not resolvable, with non-error messages. The non-error messages can include substantially any type of content or information, such as advertisements, promotional or other information for products, persons or ideas, publications, educational materials, public service announcements or substantially any other types of information, or a link to one or more additional resources through a resource address.

For example, the method of the present invention could be used to replace errors generated by an address resolution server, such as a DNS (domain name service) server, by non-error messages. The non-error messages may redirect the software application requesting the address resolution to a particular Web page, for example. This particular Web page is optionally specific to the particular resource name, to the type of software program requesting the resource address resolution, and/or to the identity or other properties of the requesting user. Preferably, the non-error message is generated by a hardware device and is then sent by this hardware device to the software program requesting the address resolution, instead of the error message. However, the error message may also be replaced by software components, including but not limited to, drivers and software programs, running either on the server computer, the client computer or another computer system between the server computer and the client computer. The error message is optionally replaced explicitly, in that the error message is actually generated before being replaced in a two-stage process; or implicitly, in that the non-error message is generated rather than the error message, in a single stage process.

Other examples include error messages generated by other servers such as HTTP (Hypertext Transfer Protocol) servers, E-mail servers, FTP (File Transfer Protocol) servers, or Telnet servers, and error messages generated by a firewall in place of a server, when a particular request is not permitted.

According to the present invention, there is provided a system for replacing an error message with a non-error message when a query is non-resolvable, the system comprising: (a) a network device for sending the query; (b) a server device, connected to the network device, for receiving the query and for determining whether the query is resolvable by the server device, such that if the query is non-resolvable, the server device generates the error message; and (c) a non-error message generator for intercepting the error message and for altering at least a portion of the error message to form the non-error message, the non-error message generator sending the non-error message to the network device.

According to another embodiment of the present invention, there is provided a method for replacing an error message with a non-error message when a query is not resolvable, the steps of the method comprising: (a) providing a network device for connecting to the network; (b) providing a server for connecting to the network; (c) sending the query by the network device to the server; (d) receiving the query; (e) if the query is not resolvable, generating the error message by the server; (f) intercepting the error message; (g) altering at least a portion of the error message to form the non-error message; and (h) sending the non-error message in place of the error message to the network device.

Optionally and preferably, the non-error message generator could be an implicit feature of the server device, such that the server device does not actually produce the error message. Rather, the server device would directly produce the non-error message.

Hereinafter, the term "Web browser" refers to any software program, which can display multimedia data such as text, graphics, or both, from Web pages on World Wide Web sites. Hereinafter, the term "Web page" refers to any document available for download and display, including, but not limited to, documents written in a mark-up language such as HTML (Hyper-text Mark-up Language), VRML (Virtual Reality Modeling Language), dynamic HTML, XML (Extended Mark-up Language) or related computer languages thereof. Hereinafter, the term "Web site" refers to at least one Web page, and preferably a plurality of Web pages, virtually connected to form a coherent group. For the purposes of the present invention, the terms "Web page" and "Web site" are interchangeable. Hereinafter, the term "HTTP server" refers to a server which serves at least one Web page to a Web browser.

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "address resolution" refers to a process in which a resource name is translated or resolved to a resource address, such that the resource name is the input to the process and the resource address is the output. This mechanism can be used with substantially any type of computer network. Examples of resource names include but are not limited to an URL (uniform resource locator) and an e-mail address. Examples of resource addresses include but are not limited to an IP address, optionally with protocol dependent information. Alternatively, the address resolution mechanism could be employed to resolve an IP address (as the resource name) to an URL (as the resource address).

Hereinafter, the term "computer network" refers to a connection between at least two computers which allows these computers to communicate.

Hereinafter, the term "user" is the person who operates the system of the present invention, or alternatively is a software program, hardware device or firmware device which controls the system of the present invention.

Hereinafter, the term "computer platform" refers to a particular computer hardware system, optionally with a software operating system. Examples of such hardware systems include, but are not limited to, personal computers (PC), palmtops, handheld computers, Macintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.X™ (in which "x" is a version number, such as "Windows 3.1™"), Windows CE™, Windows95™ and Windows98™, as well as upgraded versions of any of these operating systems and any suitable operating system for embedded units or palmtop/handheld type computers.

For the present invention, a software application could be written in substantially any suitable programming language, which could easily be selected by one of ordinary skill in the art. The programming language chosen should be compatible with the computing platform according to which the software application is executed. Examples of suitable programming, languages include, but are not limited to, C, C++ and Java.

In addition, the present invention could be implemented as software, firmware, or hardware or as a combination thereof. For any of these implementations, the functional steps performed by the method could be described as a plurality of instructions performed by a data processor. Alternatively, these instructions could be added as modifications to existing software program code, or even as an entirely new software program which generates a non-error message when an error occurs, rather than generating an error message. The message optionally comprises one or more communication packets.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for replacing error messages, received from a server as a result of requests which are not resolvable, with non-error messages. The non-error messages can include substantially any type of content or information, such as advertisements, promotional or other information for products, persons or ideas, publications, educational materials, public service announcements or substantially any other types of information, or a link to one or more additional resources through a resource address.

For example, the method of the present invention could be used to replace errors generated by an address resolution server, such as a DNS (domain name service) server, by non-error messages. The non-error messages may redirect the software application requesting the address resolution to a particular Web page, for example. This particular Web page is optionally specific to the particular resource name, to the type of software program requesting the resource address resolution, and/or to the identity or other properties of the requesting user. Preferably, the non-error message is generated by a hardware device and is then sent by this hardware device to the software program requesting the address resolution, instead of the error message. However, the error message may also be replaced by software components, including but not limited to, drivers and software programs, running either on the server computer, the client computer or another computer system between the server computer and the client computer. The error message is optionally replaced explicitly, in that the error message is actually generated before being replaced in a two-stage process; or implicitly, in that the non-error message is generated rather than the error message, in a single stage process.

Other examples include error messages generated by other servers such as HTTP (Hypertext Transfer Protocol) servers, E-mail servers, FTP (File Transfer Protocol) servers, or Telnet servers, and error messages generated by a firewalls in place of a server, when a particular request is not permitted.

The principles and operation of the system and method according to the present invention may be better understood with reference to the drawings and the accompanying description.

Figure 1:
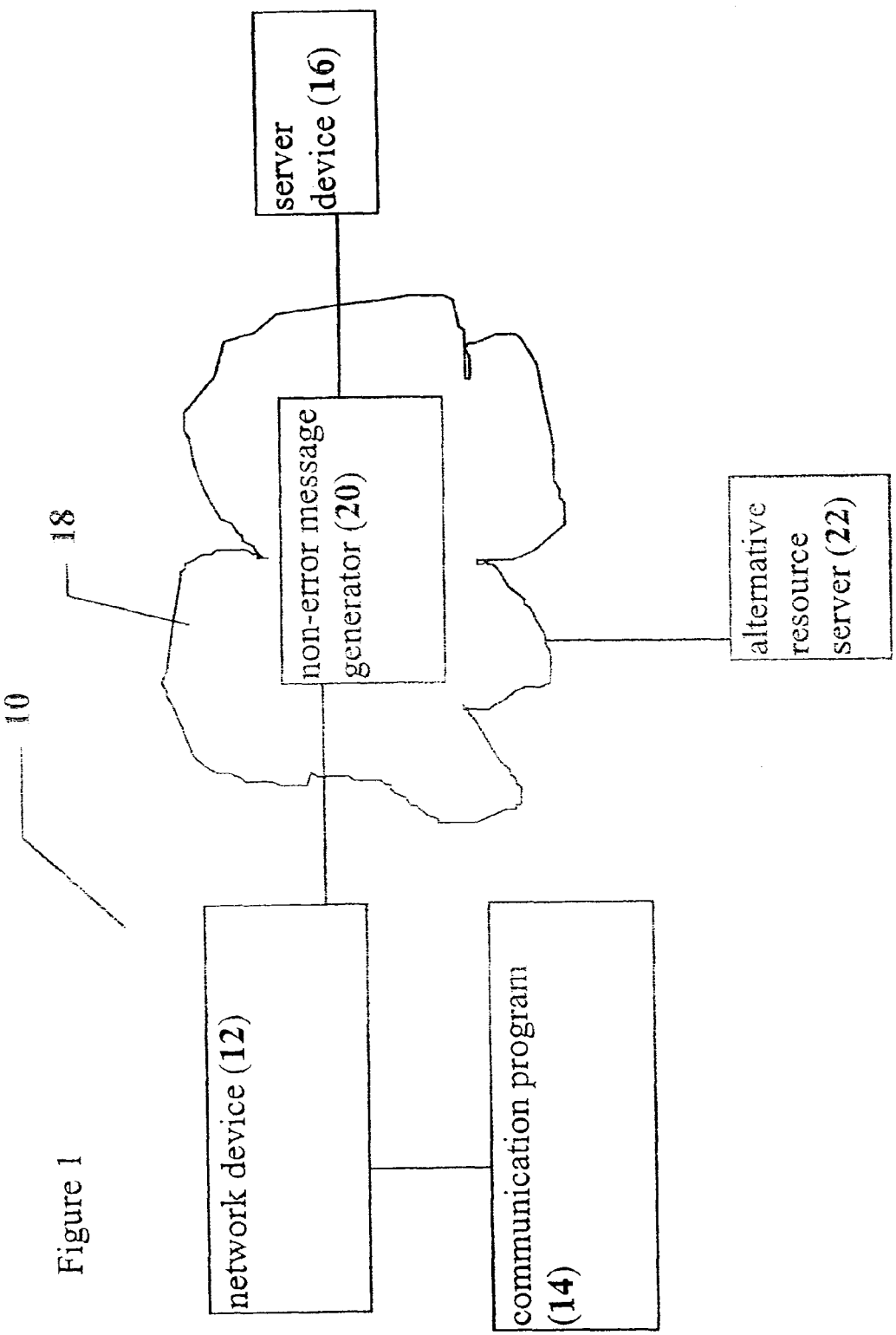
FIG. 1 is a schematic block diagram illustrating an exemplary system according to the present invention.

Referring now to the drawings, FIG. 1 is a schematic block diagram illustrating an exemplary system according to the present invention. A system 10 according to the present invention features a network device 12 for operating a communication software program 14. Network device 12 could be a computer or a router, for example. If network device 12 is a computer, then communication software program 14 could be an e-mail software program for sending e-mail or a Web browser for example. The following discussion centers upon network device 12 as a computer, it being understood that this is for the purpose of discussion only and is not meant to be limiting in any way. For example, network device 12 could be another server.

Network device 12 is connected to a server device 16 through a network connection 18. Server device 16 resolves the queries from network device 12. For example, server device 16 resolves the address resolution requests of communication program 14 by translating a resource name into a corresponding resource address. If server device 16 is a DNS (Domain Name Service) server, then the resource address is the IP (Internet Protocol) address, optionally with additional data. If server device 16 is able to resolve the query, then server device 16 returns the translated address to network device 12.

Alternatively, if server device 16 is not able to resolve the query, for example because server device 16 cannot match the requested resource name to a resource address, then server device 16 generates and sends an error message. This error message is intercepted by non-error message generator 20, which sends a non-error message to network device 12 in place of the error message. Preferably, the steps of intercepting and replacing the error message occur automatically. Most preferably, the steps of intercepting and replacing the error message occur before network device 12 receives the error message. Non-error message generator 20 could be a software component being operated by server device 16 directly or alternatively by a computer in communication with server device 16. More preferably, non-error message generator 20 is a hardware device, which is separated from server device 16 as a separate hardware device, or alternatively is integrally formed with server device 16 in a single hardware device.

Network device 12 receives a non-error message containing information alone, a resource address directing network device 12 to an alternative resource, or a combination thereof. The alternative resource is presented since the originally requested resource in the query of network device 12 either does not exist or else is not available.

The non-error message received by network device 12 is optionally specific either to the resource name in the query, to communication program 14, and/or to the identity or other properties of the user who operates communication program 14. For example, if communication program 14 is a Web browser, then the non-error message could be the address of a Web page as a resource address. The Web page could include substantially any type of content or information, such as advertisements, promotional or other information for products, ideas, publications, educational materials, public service announcements or substantially any other types of information.

For example, the non-error message could cause network device 12 to connect to an alternative resource server 22. Alternative resource server 22 would then send a response to network device 12, which could include a Web page. This response could be constructed according to the resource name, to communication program 14, and/or to the identity or other properties of the user. For example, the resource name could be used to select an advertisement for display on the Web page according to one or more keywords contained in the resource name, such that a resource name containing the word "parent" might result in the display of a Web page and/or of an advertisement related to parenting. The resource name could be obtained directly from network device 12, or alternatively could be obtained from non-error message generator 20.

Alternatively and preferably, the resource name could be used as the input to search engine (not shown), by obtaining one or more keywords for performing a search with the search engine, for example. The output of the search engine would be returned to network device 12. The search engine could search through a database for storing Internet addresses, for example. The resource name could also be used as a command for an interpreter, which would attempt to interpret the resource name as a command and which would then perform one or more actions according to the resource name.

Figure 2A:
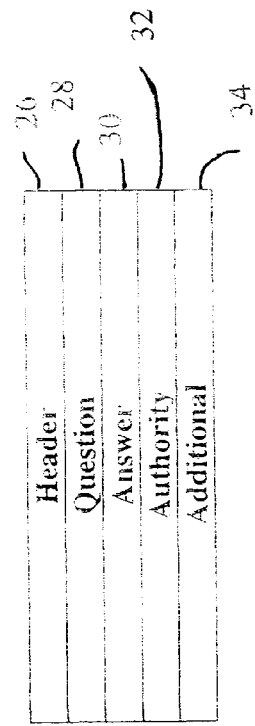
FIGS. 2A and 2B are schematic block diagrams of a background art DNS packet and DNS header.
Figure 2B:
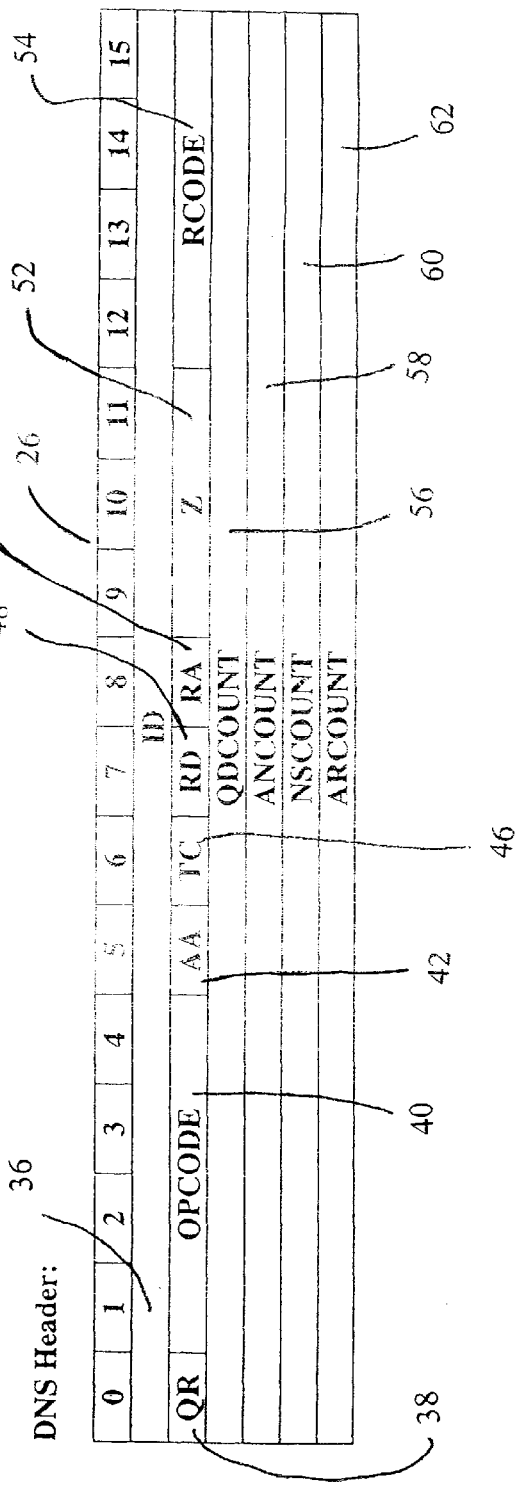
Figure 3:
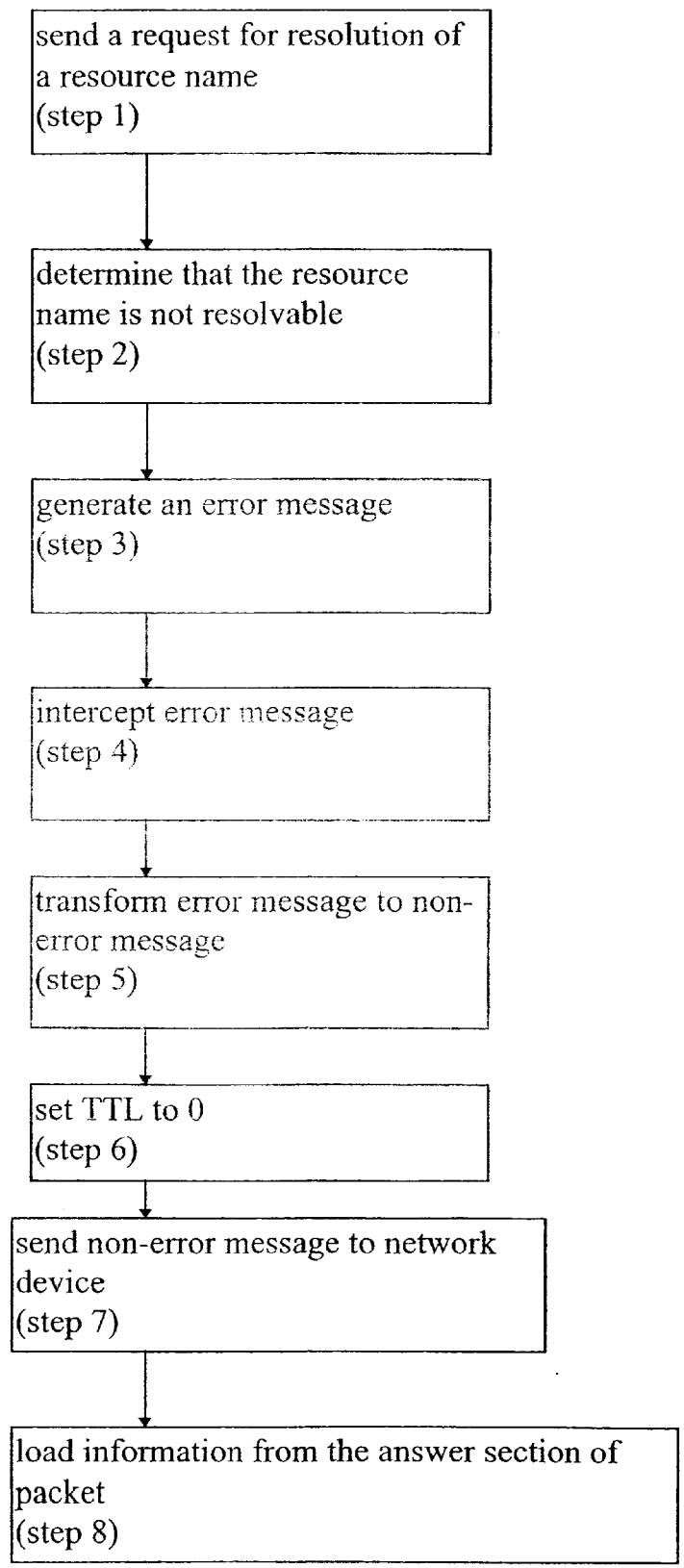
FIG. 3 is a flowchart of an exemplary method according to the present invention.

Reference is now made to FIGS. 2A and 2B for a schematic block diagram of a DNS packet and of a DNS header, respectively, and to FIG. 3 for a description of an exemplary method according to the present invention. The method of the present invention is explained with regard to a DNS server, it being understood that this is for the purposes of explanation only and is not meant to be limiting.

As shown in FIG. 2A, a background art DNS packet 24 has a number of sections, the first of which is a header 26, followed by a query section 28, an answer section 30, an authority section 32 and an additional section 34.

FIG. 2B shows header 26 in more detail. An ID field 36 is a 16-bit field which is used to correlate queries and responses. A QR field 38 is a 1-bit field which identifies DNS packet 24 as being a query message or a response message. An OPCODE field 40 is a 4-bit field which describes the type of message. An AA field 42 is a 1-bit authoritative answer field. A TC field 46 is a 1-bit truncation field, which when set, indicates that the message has been truncated. A RD field 48 is a 1-bit field, which when set to 1, requests a recursive service by the name server. A RA field 50 is a 1-bit field, which when set to 1, indicates the availability of the recursive service by the name server. A Z field 52 has no current function and must be set to 0.

An RCODE field 54 is a response code field, which is a 4-bit field set by the name server to identify the status of the query as follows:
0—No error condition.
1—Unable to interpret query due to format error.
2—Unable to process due to server failure.
3—Name in query does not exist.
4—Type of query not supported.
5—Query refused.

A QDCOUNT field 56 is a 16-bit question count field which defines the number of entries in the question section. An ANCOUNT field 58 is a 16-bit answer count field which defines the number of entries in the answer section. A NSCOUNT field 60 is an authority count field which defines the number of name server resource records in the authority section. An ARCOUNT field 62 is a 16-bit field which identifies the number of resource records in the additional records section.

As described now also with regard to FIG. 3, the exemplary method of the present invention is specifically described with regard to packets generated according to the UDP/IP protocol, in which a single packet contains the header. However, this is for the purposes of discussion only and is not meant to be limiting in any way. In particular, the method of the present invention would also be suitable for packets generated according to the TCP/IP protocol, in which the header may be contained in one packet or in a plurality of packets.

In step 1, a network device sends a request, including a resource name, to a DNS server for a particular resource address. In step 2, the DNS server is unable to translate the requested resource name into a resource address. In step 3, the DNS server generates an error message.

In step 4, the error message is intercepted by the non-error message generator. The error message is detected by examining the header of the packet, and more specifically by examining the QR field and the RCODE field. If the message is an error message, then the QR field should be set to 1, and the RCODE field should have a value greater than 0. Next, the error message is turned into a non-error message in step 5 by altering at least a portion of the packet. Preferably, this step is performed by editing the header to set the RCODE field to 0, the ANCOUNT field to 1 and the NSCOUNT field to 0. Next, if the desired answer information includes a resource address such as an IP address, then the desired information is inserted into the answer section of the packet. Any information in the authority section is deleted. In particular, if the authority section contains an entry of "SOA-RR", for negative caching, then this information is deleted and the NSCOUNT field is set to 0.

In step 6, the TTL (time to live) field is set to 0. In step 7, the non-error message is sent to the network device. In step 8, the communication software package of the network device optionally and preferably loads the information from the resource address given in the answer section of the packet, such as a Web page for example.

This method could be used for a number of different applications, including various Internet communication protocols such as HTTP (hypertext transfer protocol), FTP (file transfer protocol), Telnet and Ping. In addition, this method could be used for e-mail messages, by replacing the e-mail error message with a different e-mail message, containing a link to a Web page, an advertisement, search results, or any other information or content.

While the invention has been described with respect to a limited number of embodiments, it will be appreciated that many variations, modifications and other applications of the invention may be made.

What is claimed is:

1. A system for sending a non-error message when a query is non-resolvable, the system comprising:
   (a) a network device for sending the query;
   (b) a server device, connected to said network device, for receiving the query and for determining whether the query is resolvable by said server device, such that if the query is non-resolvable, said server device forms the non-error message and sends the non-error message to said network device.

2. The system of claim 1, wherein the query is for a requested resource name, said requested resource name being non-resolvable to a resource address.

3. A system for replacing an error message with a non-error message when a query is non-resolvable, the system comprising:
   (a) a network device for sending the query;
   (b) a server device, connected to said network device, for receiving the query and for determining whether the query is resolvable by said server device, such that if said query is non-resolvable, said server device generates the error message; and
   (c) a non-error message generator for intercepting the error message and for altering at least a portion of the error message to form the non-error message, said non-error message generator sending the non-error message to said network device.

4. The system of claim 3, wherein the query is an address resolution request containing a resource name, such that if said server device cannot match said resource name to a resource address, said address resolution request is non-resolvable.

5. The system of claim 4, wherein the error message is composed of at least one packet, such that said at least a portion of the error message is altered by changing said at least one packet of the error message to form the non-error message.

6. The system of claim 5, further comprising:
   (d) a communication software program for being operated by said network device and for displaying the non-error message.

7. The system of claim 6, wherein said communication software program is an e-mail program, and the non-error message is an e-mail message.

8. The system of claim 7, wherein said e-mail message includes an advertisement.

9. The system of claim 8, wherein said advertisement is determined according to said resource name.

10. The system of claim 7, wherein said e-mail message includes a resource address.

11. The system of claim 7, wherein said e-mail message includes a result of a search by a search engine, said search by said search engine being performed with said resource name as at least one keyword.

12. The system of claim 6, wherein said communication software program is a Web browser, and the non-error message is a Web page.

13. The system of claim 12, wherein said Web page includes an advertisement.

14. The system of claim 13, wherein said advertisement is determined according to said resource name.

15. The system of claim 12, wherein said Web page includes a result of a search by a search engine, said search by said search engine being performed with said resource name as at least one keyword.

16. The system of claim 6, wherein said server device is selected from the group consisting of a DNS server and an HTTP server, said communication software program is a Web browser, and the non-error message directs said communication software program to display a Web site.

17. The system of claim 6, wherein said server device is a firewall acting as a server device.

18. The system of claim 6, further comprising:
   (e) an interpreter for receiving said resource name from a source selected from the group consisting of said non-error message generator and said network device, and for executing at least one instruction determined according to said resource name.

19. The system of claim 3, wherein said non-error message generator is a hardware device connected to said server device.

20. The system of claim 3, wherein said non-error message generator is a hardware device integrally formed with said server device.

21. The system of claim 3, wherein said non-error message generator is a software program operated by said server device.

22. The system of claim 3, further comprising:
   (d) a second network device for operating said non-error message generator as a software program.

23. A method for replacing an error message with a non-error message when a query is not resolvable, the steps of the method comprising:

(a) providing a network device for connecting to the network;
(b) providing a server for connecting to the network;
(c) sending the query by said network device to said server;
(d) receiving the query;
(e) if the query is not resolvable, generating the error message by said server;
(f) intercepting the error message;
(g) altering at least a portion of the error message to form the non-error message; and
(h) sending the non-error message in place of the error message to said network device.

24. The method of claim 23, where in steps (e)–(g) are performed by generating the non-error message if the query is not resolvable, such that the error message is not generated.

25. The method of claim 23, wherein the error message is composed of at least one packet featuring a header and an answer section, and wherein step (g) comprises the steps of:
(i) altering said header of said at least one packet; and
(ii) adding additional information to said answer section of said at least one packet.

26. The method of claim 25, wherein said additional information includes a resource address.

27. The method of claim 26, wherein step (f) further comprises the step of detecting the error message by examining said header.

28. A method for replacing an error message with a non-error message when a query is not resolvable, the steps of the method comprising:
(a) providing a network device for connecting to the network;
(b) providing a server device for connecting to the network;
(c) sending the query by said network device to said server device;
(d) receiving the query by server device;
(e) if the query is not resolvable, generating the error message by said server device;
(f) intercepting the error message before said network device receives the error message; and
(g) sending the non-error message in place of the error message to said network device.

* * * * *